United States Patent [19]

Ayaki et al.

[11] 3,789,141

[45] Jan. 29, 1974

[54] BURST AMPLIFIERS FOR COLOR TELEVISION RECEIVERS

[75] Inventors: Susumu Ayaki; Masaru Shimano, both of Yokohama, Japan

[73] Assignee: Hitachi, Ltd., Tokyo, Japan

[22] Filed: Apr. 25, 1972

[21] Appl. No.: 247,338

[30] Foreign Application Priority Data

Apr. 30, 1971 Japan .............................. 46/27965

[52] U.S. Cl. ... 178/69.5 CB, 178/5.4 SY, 330/30 D

[51] Int. Cl. ............................................ H04n 9/44

[58] Field of Search 178/69.5 CB, 5.4 SY; 330/30 D

[56] References Cited

UNITED STATES PATENTS 3,628,046 12/1971 Bilotti ............................ 330/30 D

*Primary Examiner*—Robert L. Richardson

*Attorney, Agent, or Firm*—Paul M. Craig, Jr. et al.

[57] ABSTRACT

An amplifier used for extracting a color burst signal from the chrominance signal in color television receivers, which includes no resonant-circuit but comprises three pairs of transistors and which is especially suitable for fabrication in the form of an integrated circuit.

2 Claims, 3 Drawing Figures

BURST AMPLIFIERS FOR COLOR TELEVISION RECEIVERS

BACKGROUND OF THE INVENTION

1. Field of the Invention

This invention relates to a burst amplifier for color television receivers, which may be conveniently fabricated in the form of semiconductor integrated circuits.

2. Description of the Prior Art

In the typical color television system, a reference signal of 8 to 12 cycles used for demodulating the chrominance signal is transmitted in superimposition on the composite video signal. This signal, which is called a burst signal, must be separated from the chrominance signal by means of an extraction circuit called a burst amplifier.

FIG. 1 is a typical connection diagram of the conventional burst amplifier, in which reference numeral 1 designates an input terminal for the chrominance signal, 2 an input terminal for a gating pulse, 3 a power input terminal, and 4 a terminal from which the burst signal is given out.

The chrominance signal introduced by way of the input terminal 1 is led through a coupling capacitor $C_1$ to the base of a transistor $Q_1$. As a positive pulse which lasts for the duration of the burst signal is also applied to the base of transistor $Q_1$ via the terminal 2 and a resistor $R_1$ to make the same transistor active only during presence of the burst signal, this signal is amplified, and it is selected by a resonant circuit consisting of a capacitor $C_2$, resistor $R_2$ and transformer $T_1$ and taken out through the output terminal 4. However, as the positive gating pulse does not appear during absence of the burst signal to thereby keep the transistor $Q_1$ in the cut-off state, the chrominance signal applied to the base of the transistor $Q_1$ is not amplified.

While the above-described known circuit which includes a resonant circuit in the output stage is convenient enough for extracting the burst signal, it has several drawbacks as follows.

1. The resonant circuit ($C_2$, $R_2$, $T_1$) is indispensable to damp the gating pulse in the output.
2. An adjustment is required for compensating error in the resonant frequency due to tolerances of the circuit components ($C_2$, $T_1$).
3. The difficulty of fabricating the resonant circuit in the form of an integrated circuit hampers production of IC type burst amplifiers.
4. It will be understood that if the resonant circuit is substituted by a resistor, the gating pulse will not be eliminated in the output signal.

SUMMARY OF THE INVENTION

An object of this invention is to provide a new and useful burst amplifier for color television receivers.

Another object of this invention is to provide such a burst amplifier which includes no resonant circuit.

A further object of this invention is to provide a burst amplifier which is suitable to be fabricated into a semiconductor integrated circuit.

A still further object of this invention is to provide a burst amplifier which lets out no vestige of the gating pulse in the output.

According to the invention, there is provided a burst amplifier for color television receivers comprising;

a first pair of transistors, the emitters of the first and the second transistors in said first pair being connected to ground through an impedance means which can pass a direct current;

a second and a third pair of transistors, the emitters of the first and the second transistors in said second pair being connected to the collector of the first transistor in said first pair, the emitters of the first and the second transistors in said third pair being connected to the collector of the second transistor in said first pair, the base of the first transistor in said second pair and the base of the second transistor in said third pair being connected together, the base of the second transistor in said second pair and the base of the first transistor in said third pair being connected together, the collector of the first transistor in said second pair and the collector of the first transistor in said third pair being connected to a power supply, and the collector of the second transistor in said second pair and the collector of the second transistor in said third pair being connected together; and a load connected between said power supply and the connecting point of the collectors of the second transistors in said second and third pairs.

In the present invention, the impedance means which can pass a direct current is a resistor or a constant current circuit. The constant current circuit may be a transistor whose base is supplied with a constant bias voltage.

In the present invention, by supplying a chrominance signal to one of the base of the first and second transistors in the first pair, and by supplying a gating pulse to one of the connecting points of the bases of the transistors in the second and third pairs, the burst signal is obtained across the load.

In one of the embodiment of the invention, a pulse forming circuit is used to form the gate pulse. The pulse forming circuit comprises a fourth pair of transistors, in which the emitters of both transistors are connected together, the collector of one transistor is connected to the power supply and the collector of the other transistor is connected through a resistor to the power supply.

DESCRIPTION OF THE PREFERRED EMBODIMENT

Figure 1:
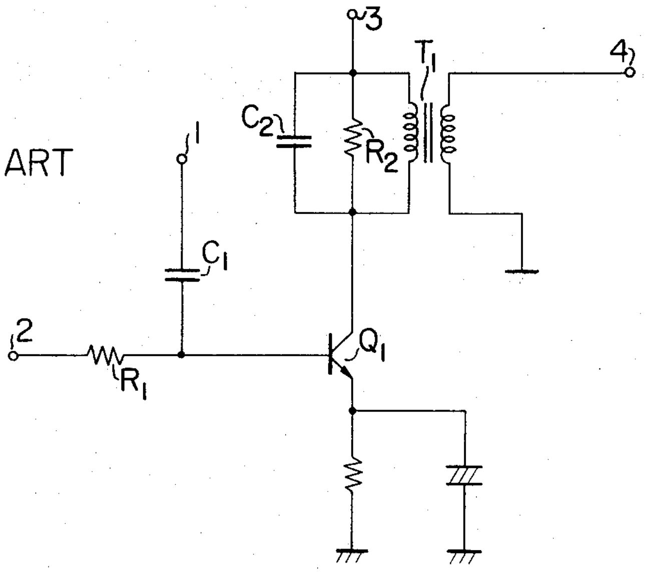
FIG. 1 PRIOR ART
FIG. 1 is a circuit diagram of the conventional burst amplifier, as mentioned hereinbefore.
Figure 2:
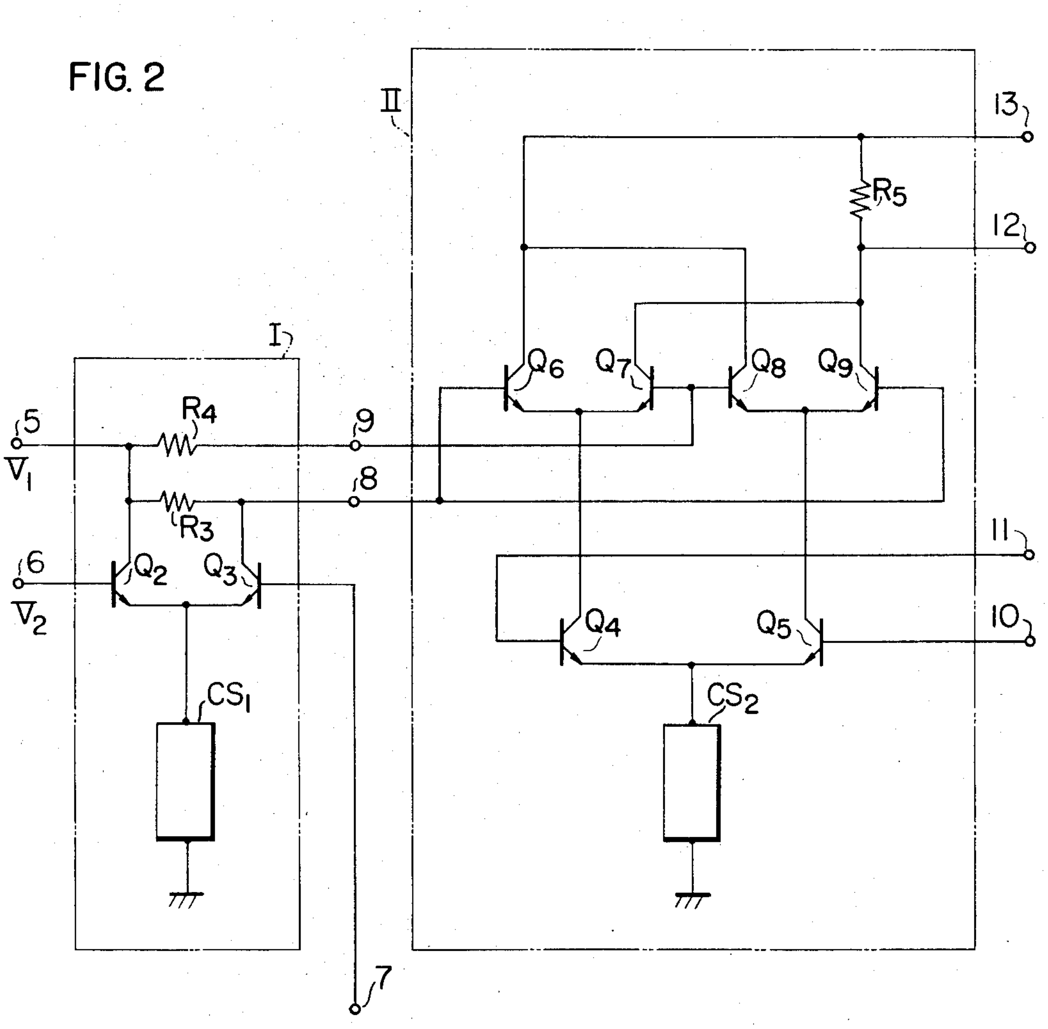
FIG. 2 is a circuit diagram used for explaining the operation principle of the burst amplifier of this invention.

The operation principle of the burst amplifier of this invention is explained hereunder with reference to FIG. 2, in which block I is a gating pulse shaping circuit, and block II is the burst amplifier. Reference numeral 5 designates a terminal to be connected to a source of dc voltage $V_1$, 6 a terminal to be connected to a source of a dc reference voltage $V_2$, 7 an input terminal for the gating pulse, 8 and 9 terminals through which the shaped gating pulse is supplied to the burst amplifier II, 10 a terminal to be connected to a dc voltage source, 11 an input terminal to which the chrominance signal including the burst signal is applied, 12 an output terminal through which the separated burst signal is derived, and 13 a power supply terminal.

The gating pulse shaping circuit I consists of transistors $Q_2$ and $Q_3$, which constitute a first differential amplifier, and a constant current component $CS_1$. The emitters of both transistors are connected together to the constant current component $CS_1$. The collector of the transistor $Q_2$ is directly connected to the terminal 5, while the collector of the transistor $Q_3$ is connected to the terminal 5 and the collector of the transistor $Q_2$ through a resistor $R_3$. The collector of the transistor $Q_3$ is also connected to the terminal 8, and the collector of the transistor $Q_2$ is further connected to the terminal 9 through a resistor $R_4$ which has almost the same value as the resistor $R_3$.

During the bursting period, a gating voltage pulse higher than the dc reference voltage $V_2$ is applied to the base of the transistor $Q_3$ through the terminal 7. Therefore, the transistor $Q_2$ is cut off while the transistor $Q_3$ is conductive. Accordingly, a major part of the current flowing through the constant current component $CS_1$ passes through the resistor $R_3$, thereby causing the potential at the terminal 8 to be lower than that at the terminal 9. On the other hand, during the period other than the bursting period, the amplitude of the gating pulse is lower than the reference voltage. Therefore, the transistor $Q_2$ is conductive while the transistor $Q_3$ is not conductive. Accordingly, the currents flowing through the identical resistors $R_3$ and $R_4$ are also identical to each other and the potentials at the terminals 8 and 9 are identical. Namely, the potential at the terminal 8 is lower than that at the terminal 9 during the bursting period, but the former is substantially equal to the latter during the other period of each horizontal sweep cycle.

The burst amplifier II comprises three differential amplifiers designated respectively as a second, a third and a fourth differential amplifier for the convenience of explanation in this specification, each including a pair of transistors with the emitters thereof connected together. The second differential amplifier essentially consists of transistors $Q_4$ and $Q_5$ and a constant current component $CS_2$, and the collectors of these transistors are respectively connected to the common emitters of the third and fourth differential amplifiers. Each of the collectors of the transistors $Q_6$ and $Q_7$ in the third differential amplifier is connected to each of the collectors of the transistors $Q_8$ and $Q_9$ in the fourth differential amplifier, and one of the thus formed connections is directly connected to the power supply terminal 13, while the other connection is connected to the same terminal through a load resistor $R_5$. Further, the bases of the transistors $Q_6$ and $Q_7$ are connected to the bases of the transistors $Q_9$ and $Q_8$ respectively so that a current flowing through the load resistor $R_5$ is not influenced by the gating pulse applied to the bases of the transistors $Q_6$ and $Q_9$.

In the above-described circuit, the chrominance signal (including the burst signal) superimposed on a dc bias voltage is applied to the base of the transistor $Q_4$ in the second differential amplifier through the terminal 11. The chrominance signal including the burst signal is amplified by the transistors $Q_4$ and $Q_5$ in opposite directions. Thus, the collector currents of the transistors $Q_4$ and $Q_5$ are equal in the amplitude and opposite in the direction.

During the bursting period, the voltage applied to the bases of the transistors $Q_6$ and $Q_9$ through the terminal 8 is lower than the voltage applied to the bases of the transistors $Q_7$ and $Q_8$ through the terminal 9 as explained hereinbefore. Therefore, the transistors $Q_6$ and $Q_9$ are rendered non-conductive during the said period, while the signal currents from the transistors $Q_4$ and $Q_5$ flow respectively through the transistors $Q_7$ and $Q_8$ and return to the power source, the former through the load resistor $R_5$ and the latter directly. Thus the burst signal amplified through the transistors $Q_4$ and $Q_7$ is derived from the amplifier II through the output terminal 12.

During the period other than the bursting period, on the other hand, the potential at the bases of the transistors $Q_6$ and $Q_9$ is equal to the potential at the bases of the transistors $Q_7$ and $Q_8$ as already explained. Therefore, the signal current from the transistor $Q_4$ is equally divided between the transistors $Q_6$ and $Q_7$. Similarly, the signal current of the transistor $Q_5$ is equally divided between the transistors $Q_8$ and $Q_9$. As is obvious, the signal current supposed to flow through the load current $R_5$ is the sum of the collector signal current of the transistor $Q_7$ and the similar current of the transistor $Q_9$, these respectively corresponding to halves of the collector signal currents of the transistors $Q_4$ and $Q_5$. It will be reminded that the collector signal currents of the transistors $Q_4$ and $Q_5$ are equal in the amplitudes and opposite in the direction. Therefore, the sum of both currents, or the current flowing through the load resistor $R_5$, is zero. Thus, in the period other than the bursting period, no signal appears at the output terminal 12. Namely, the burst amplifier gives out no chrominance signal.

Next, consideration is given to the direct current flowing through the load resistor $R_5$. During the bursting period, the direct current flowing through the resistor $R_5$ is equal to the collector current of the transistor $Q_4$, as the transistors $Q_6$ and $Q_9$ are non-conductive. During the other period, the direct current in question is the sum of a half of the respective collector currents of the transistors $Q_4$ and $Q_5$. This sum of the currents corresponds to the collector current of the transistor $Q_4$, as the dc component of the collector current of the transistor $Q_4$ is equal to that of the transistor $Q_5$ in the magnitude as well as in the direction. Thus, the direct current flowing through the resistor $R_5$ does not change through the bursting period and the remaining period, and accordingly, the dc potential at the output terminal 12 is constant.

As explained above, in the burst amplifier of the present invention, two equal but opposite signal currents flow through the load resistor $R_5$ to cancel each other during the period other than the bursting period. However, in the bursting period, only one of the said two signal currents flows through the resistor $R_5$. Thus, the amplified burst signal is extracted. Further, according to the present invention, the dc component of the current in the resistor $R_5$ is constant through the whole period of a horizontal cycle.

Figure 3:
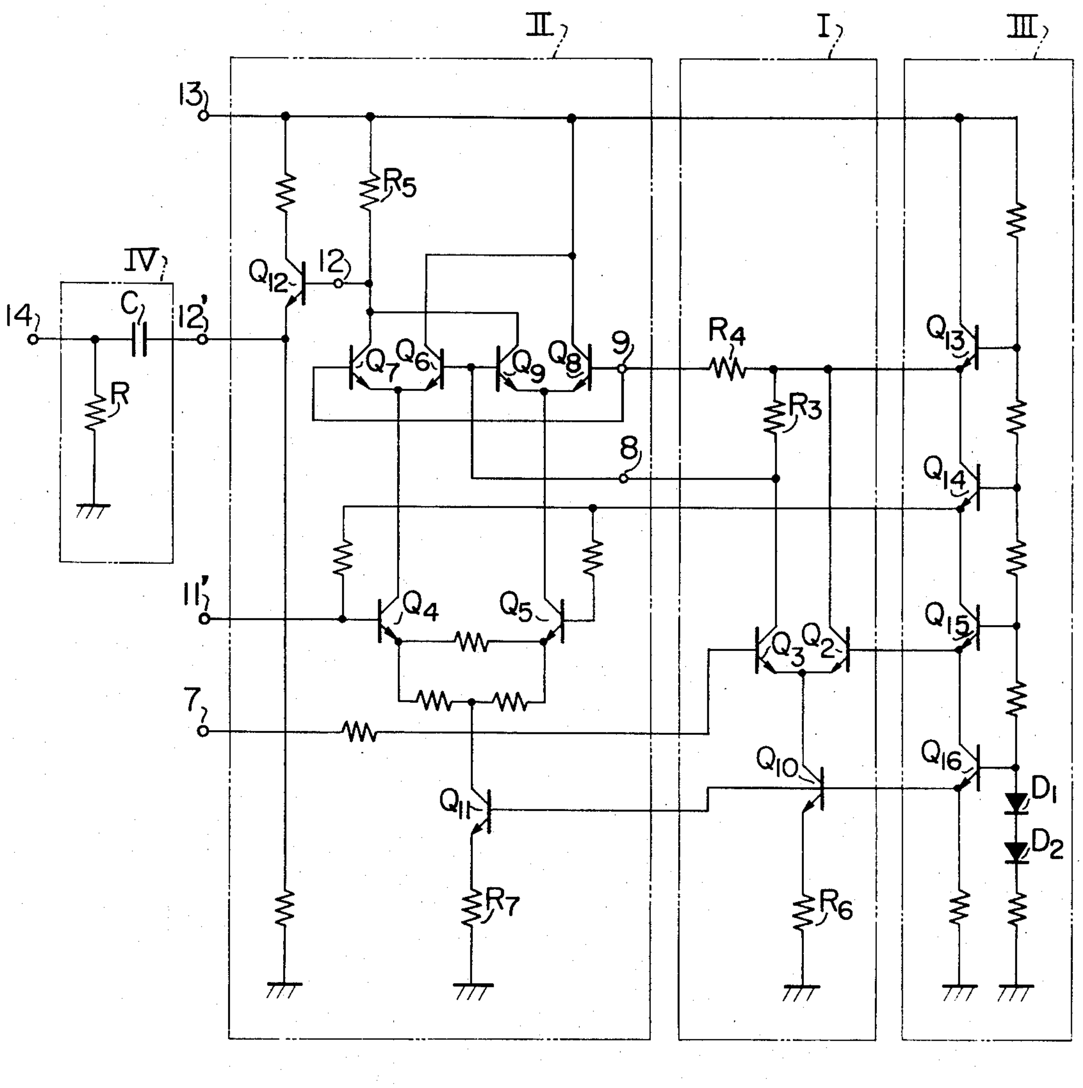
FIG. 3 is a circuit diagram of an embodiment of the burst amplifier of this invention.

An embodiment of this invention is shown in FIG. 3, in which reference numeral 14 designates a terminal through which the burst signal extracted by the burst amplifier (block II) is given out. Block III is a voltage divider for supplying dc bias voltages and IV a differentiating circuit using a capacitor C and a resistor R. Block I is a pulse shaping circuit comprising transistors $Q_2$ and $Q_3$ constituting a differential amplifier, a transistor $Q_{10}$ for maintaining the current therethrough constant and a resistor $R_6$. Gating pulses supplied through the terminal 7 are shaped by the pulse shaping circuit I and then applied to the bases of the transistors $Q_6$ and $Q_9$. A constant dc voltage is applied to the bases of the transistors $Q_7$ and $Q_8$. The chrominance signal containing the burst signal is introduced through a terminal 11' and amplified by a differential amplifier comprising transistors $Q_4$ and $Q_5$, a current transistor $Q_{11}$ for maintaining the current therethrough constant and a resistor $R_7$. In the switching circuit constituted by the transistors $Q_6$, $Q_7$, $Q_8$ and $Q_9$, the burst signal is extracted from the amplified chrominance signal with the aid of the gating pulse. The extracted burst signal is then transferred to the differentiating circuit IV through a transistor $Q_{12}$ and a terminal 12'. Any vestige of the gating pulse which may remain in the extracted signal on account of inequality of characteristics of the transistors in the said switching circuit, is differentiated through the CR circuit to be thereby damped, and substantially pure burst signal is available at the terminal 14. In the Figure, transistors $Q_{13}$ to $Q_{16}$ serve to provide stabilized voltage, and diodes $D_1$ and $D_2$ function for temperature compensation.

The circuit of this invention is most suitable for fabrication in the form of an integrated circuit on a silicon substrate using the semiconductor circuit technique. According to the technique, the transistor pairs can be formed within a small area of a silicon substrate under common conditions. Therefore, it is not difficult for the produced transistors to have identical characteristics (current amplification factor, base-emitter voltage etc.).

As described above, according to this invention, a burst amplifier which includes no resonant circuit nor a coupling transformer in the output circuit thereof and in which the dc potential at the output terminal is not affected by the gating pulse, is obtained. Further, the circuit of the present invention is suitable for fabrication in the form of an integrated circuit, also for the reason that all components in the circuit are directly connected to each other.

It will be understood that this invention is applicable not only to the amplifier for extracting the burst signal but also to an amplifier for eliminating the same signal.

We claim:

1. A burst amplifier for color television receivers comprising;

a first pair of transistors, the emitters of the first and the second transistors in said first pair being connected to ground through a transistor whose base is connected to a source of constant voltage;

a second and a third pair of transistors, the emitters of the first and the second transistors in said second pair being connected to the collector of the first transistor in said first pair, the emitters of the first and the second transisters in said third pair being connected to the collector of the second transistor in said first pair, the base of the first transistor in said second pair and the base of the second transistor in said third pair being connected together, the base of the second transistor in said second pair and the base of the first transistor in said third pair being connected together, the collector of the first transistor in said second pair and the collector of the first transistor in said third pair being connected to a first power supply, and the collector of the second transistor in said second pair and the collectOr of the second transistor in said third pair being connected together;

a load connected between said first power supply and the connecting point of the collectors of the second transistors in said second and third pair;

a fourth pair of transistors, the emitters of the first and the second transistors in said fourth pair being connected together, the collector of the first transistor in said fourth pair being connected to a second power supply, the collector of the second transistors in said fourth pair being connected through a resistor to said second power supply;

means for connecting the collector of the first transistor in said fourth pair through a resistor to one of connecting points of the bases of the transistors in said second and third pair; and means for connecting the collector of the second transistor in said fourth pair to the other one of the connecting points of the bases of the transistor in said second and third pairs.

2. A burst amplifier for color television receivers comprising;

a first pair of transistors, the emitters of the first and the second transistors in said first pair being connected to ground through a transistor whose base is connected to a source of a constant voltage;

a second and a third pair of transistors, the emitters of the first and the second transistors in said second pair being connected to the collector of the first transistor in said first pair, the emitters of the first and the second transistors in said third pair being connected to the collector of the second transistor in said pair, the base of the first transistor in said second pair and the base of the second transistor in said third pair being connected together, the base of the second transistor in said second pair and the base of the first transistor in said third pair being connected together, the collector of the first transistor in said second pair and the collector of the first transistor in said third pair being connected to a first power supply, and the collector of the second transistor in said second pair and the collector of the second transistor in said third pair being connected together;

a load connected between said first power supply and the connecting point of the collectors of the second transistors in said second and third pair;

a fourth pair of transistors, the emitters of the first and the second transistors in said fourth pair being connected to ground through a transistor whose base is connected to said source of constant voltage, the collector of the first transistor in said fourth pair being connected to a second power supply, the collector of the second transistor in said fourth pair being connected through a first resistor to said second power supply, means for connecting the collector of the first transistor in said fourth pair through a second resistor to one of connecting points of the bases of the transistors in said second and third pair;

means for connecting the collector of the second transistor in said fourth pair to the other one of the connecting points of the bases of the transistor in said second and third pair;

means for supplying a chrominance signal to one of the bases of the first and the second transistors in said first pair;

means for supplying a gating pulse to one of the bases of the first and the second transistors in said fourth pair; and means for deriving a burst signal contained in said chrominance signal across said load.

* * * * *